US011231749B2

(12) United States Patent
Roziere

(10) Patent No.: US 11,231,749 B2
(45) Date of Patent: *Jan. 25, 2022

(54) COVER ACCESSORY DEVICE FOR A PORTABLE ELECTRONIC AND/OR COMPUTER APPARATUS, AND APPARATUS PROVIDED WITH SUCH AN ACCESSORY DEVICE

(71) Applicant: Quickstep Technologies LLC, Wilmington, DE (US)

(72) Inventor: Didier Roziere, Nimes (FR)

(73) Assignee: Quickstep Technologies LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 17/064,438

(22) Filed: Oct. 6, 2020

(65) Prior Publication Data
US 2021/0019004 A1 Jan. 21, 2021

Related U.S. Application Data

(63) Continuation of application No. 16/031,723, filed on Jul. 10, 2018, now Pat. No. 10,802,652, which is a (Continued)

(30) Foreign Application Priority Data

Nov. 19, 2013 (FR) ...................... 1361330

(51) Int. Cl.
*G06F 1/16* (2006.01)
*G06F 3/044* (2006.01)
*H04M 1/02* (2006.01)

(52) U.S. Cl.
CPC ............ *G06F 1/1656* (2013.01); *G06F 1/169* (2013.01); *G06F 1/1677* (2013.01); *G06F 3/044* (2013.01);
(Continued)

(58) Field of Classification Search
CPC ...... G06F 3/044; G06F 1/1656; G06F 1/1677; G06F 1/169; G06F 2200/1634;
(Continued)

(56) References Cited

U.S. PATENT DOCUMENTS

| 5,483,261 | A | 1/1996 | Yasutake |
| 5,488,204 | A | 1/1996 | Mead et al. |

(Continued)

FOREIGN PATENT DOCUMENTS

| CN | 1479891 A | 3/2004 |
| CN | 1270288 C | 8/2006 |

(Continued)

OTHER PUBLICATIONS

Advisory Action received for U.S. Appl. No. 16/031,723, dated May 7, 2020, 2 pages.
(Continued)

*Primary Examiner* — Kenneth B Lee, Jr.
(74) *Attorney, Agent, or Firm* — Kubota & Basol LLP

(57) ABSTRACT

The present invention relates to a device (100) for a portable user apparatus (102), including a portion (104) which can be folded over the user apparatus (102), said foldable portion (104) including at least two detection layers, each kept at a reserve potential and including at least one capacitive detection electrode: a first of said layers being arranged to carry out a function of capacitive detection of at least one control object located on one side of said foldable portion (104); a second of said layers being arranged so as to carry out a function of capacitive detection of at least one control object located on the other side of said foldable portion (104), with a view to triggering a function in the user apparatus (102). The invention also relates to an apparatus (10) provided with such an accessory device.

20 Claims, 3 Drawing Sheets

Related U.S. Application Data continuation of application No. 15/037,313, filed as application No. PCT/EP2014/074351 on Nov. 12, 2014, now Pat. No. 10,042,491.

(52) U.S. Cl.
CPC .... *G06F 3/0445* (2019.05); *G06F 2200/1634* (2013.01); *G06F 2203/04107* (2013.01); *H04M 1/0216* (2013.01); *H04M 2250/18* (2013.01); *H04M 2250/22* (2013.01)

(58) Field of Classification Search
CPC ...... G06F 2203/04107; H04M 1/0216; H04M 2250/18; H04M 2250/22
See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,844,506 A | 12/1998 | Binstead | |
| 5,880,411 A | 3/1999 | Gillespie et al. | |
| 6,009,153 A | 12/1999 | Houghton et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,459,424 B1 | 10/2002 | Resman | |
| 6,668,897 B2 | 12/2003 | Gunn | |
| 6,690,387 B2 | 2/2004 | Zimmerman et al. | |
| 6,847,354 B2 | 1/2005 | Vranish | |
| 7,010,333 B2 | 3/2006 | Trively | |
| 7,015,894 B2 | 3/2006 | Morohoshi | |
| 7,046,230 B2 | 5/2006 | Zadesky et al. | |
| 7,102,624 B2 | 9/2006 | Bottari et al. | |
| 7,176,894 B2 | 2/2007 | Oesterg et al. | |
| 7,184,064 B2 | 2/2007 | Zimmerman et al. | |
| 7,570,064 B2 | 8/2009 | Roziere | |
| 7,614,008 B2 | 11/2009 | Ording | |
| 7,620,174 B1 | 11/2009 | Bick | |
| 7,663,607 B2 | 2/2010 | Hotelling et al. | |
| 7,800,592 B2 | 9/2010 | Kerr et al. | |
| 7,808,479 B1 | 10/2010 | Hotelling et al. | |
| 7,844,914 B2 | 11/2010 | Andre et al. | |
| 8,149,002 B2 | 4/2012 | Ossart et al. | |
| 8,159,213 B2 | 4/2012 | Roziere | |
| 8,239,784 B2 | 8/2012 | Hotelling et al. | |
| 8,471,822 B2 | 6/2013 | Lightenberg | |
| 8,479,122 B2 | 7/2013 | Hotelling et al. | |
| 8,570,288 B2 | 10/2013 | Lai et al. | |
| 8,770,033 B2 | 7/2014 | Roziere | |
| 8,786,572 B2 | 7/2014 | Yilmaz | |
| 8,917,256 B2 | 12/2014 | Roziere | |
| 9,035,903 B2 | 5/2015 | Binstead | |
| 9,063,620 B2 | 6/2015 | Chan et al. | |
| 9,151,791 B2 | 10/2015 | Roziere | |
| 9,292,141 B2 | 3/2016 | Zhong et al. | |
| 10,802,652 B2 * | 10/2020 | Roziere | G06F 1/169 |
| 2001/0017142 A1 | 8/2001 | Suzuki | |
| 2002/0043933 A1 | 4/2002 | Ooishi et al. | |
| 2004/0135919 A1 | 7/2004 | Kim et al. | |
| 2005/0068304 A1 | 3/2005 | Lewis et al. | |
| 2005/0168841 A1 | 8/2005 | Ogawa | |
| 2005/0243434 A1 | 11/2005 | Endo | |
| 2006/0026536 A1 | 2/2006 | Hotelling et al. | |
| 2006/0033724 A1 | 2/2006 | Chaudhri et al. | |
| 2006/0053387 A1 | 3/2006 | Ording | |
| 2006/0085757 A1 | 4/2006 | Andre et al. | |
| 2006/0097733 A1 | 5/2006 | Roziere | |
| 2006/0097991 A1 | 5/2006 | Hotelling et al. | |
| 2006/0181517 A1 | 8/2006 | Zadesky et al. | |
| 2006/0197750 A1 | 9/2006 | Kerr et al. | |
| 2006/0197753 A1 | 9/2006 | Hotelling | |
| 2006/0227114 A1 | 10/2006 | Geaghan et al. | |
| 2006/0256095 A1 | 11/2006 | Bottari et al. | |
| 2007/0164756 A1 | 7/2007 | Lee | |
| 2008/0062139 A1 | 3/2008 | Hotelling et al. | |
| 2008/0143683 A1 | 6/2008 | Hotelling | |
| 2008/0165139 A1 | 7/2008 | Hotelling et al. | |
| 2008/0245582 A1 | 10/2008 | Bytheway | |
| 2008/0284261 A1 | 11/2008 | Andrieux et al. | |
| 2008/0309633 A1 | 12/2008 | Hotelling et al. | |
| 2009/0033343 A1 | 2/2009 | Reynolds et al. | |
| 2009/0218310 A1 | 9/2009 | Zu et al. | |
| 2010/0013800 A1 | 1/2010 | Elias et al. | |
| 2010/0044122 A1 | 2/2010 | Sleeman et al. | |
| 2010/0052700 A1 | 3/2010 | Yano et al. | |
| 2010/0200539 A1 | 8/2010 | Yun et al. | |
| 2010/0321326 A1 | 12/2010 | Grunthaner et al. | |
| 2010/0328228 A1 | 12/2010 | Elias | |
| 2011/0007021 A1 | 1/2011 | Bernstein et al. | |
| 2011/0032207 A1 | 2/2011 | Huang et al. | |
| 2011/0050625 A1 | 3/2011 | Kim et al. | |
| 2011/0134050 A1 | 6/2011 | Harley | |
| 2011/0169783 A1 | 7/2011 | Wang et al. | |
| 2011/0261010 A1 | 10/2011 | Nishitani et al. | |
| 2011/0279383 A1 | 11/2011 | Wilson et al. | |
| 2011/0285661 A1 | 11/2011 | Hotelling | |
| 2011/0291987 A1 | 12/2011 | Wang et al. | |
| 2012/0026099 A1 | 2/2012 | Harley | |
| 2012/0044662 A1 | 2/2012 | Kim et al. | |
| 2012/0056824 A1 | 3/2012 | Liu et al. | |
| 2012/0057312 A1 | 3/2012 | Yoo et al. | |
| 2012/0074961 A1 | 3/2012 | Herrmann | |
| 2012/0187965 A1 | 7/2012 | Roziere | |
| 2012/0188200 A1 | 7/2012 | Roziere | |
| 2012/0223901 A1 | 9/2012 | Kim et al. | |
| 2012/0235927 A1 | 9/2012 | Ho et al. | |
| 2012/0235949 A1 | 9/2012 | Ligtenberg | |
| 2012/0293426 A1 | 11/2012 | Chang et al. | |
| 2012/0313881 A1 | 12/2012 | Ge et al. | |
| 2013/0062179 A1 | 3/2013 | Ye et al. | |
| 2013/0090873 A1 | 4/2013 | Lundstrum et al. | |
| 2013/0135233 A1 | 5/2013 | Wang et al. | |
| 2013/0135247 A1 | 5/2013 | Na et al. | |
| 2013/0170152 A1 | 7/2013 | Wu | |
| 2013/0222323 A1 | 8/2013 | Mckenzie | |
| 2013/0241871 A1 | 9/2013 | Huang et al. | |
| 2013/0300707 A1 | 11/2013 | Hershman | |
| 2013/0307776 A1 | 11/2013 | Roziere | |
| 2013/0314625 A1 | 11/2013 | Tsai et al. | |
| 2013/0335368 A1 | 12/2013 | Lee | |
| 2014/0002378 A1 | 1/2014 | Kim et al. | |
| 2014/0069785 A1 | 3/2014 | Mohapatra et al. | |
| 2014/0085551 A1 | 3/2014 | Koo et al. | |
| 2014/0092041 A1 | 4/2014 | Ih | |
| 2014/0111222 A1 | 4/2014 | Aubauer et al. | |
| 2014/0124347 A1 | 5/2014 | Jiang | |
| 2014/0132335 A1 | 5/2014 | Rauhala et al. | |
| 2014/0202742 A1 | 7/2014 | Jones et al. | |
| 2014/0204284 A1 | 7/2014 | Yao et al. | |
| 2014/0232665 A1 | 8/2014 | Lee et al. | |
| 2014/0266255 A1 | 9/2014 | More | |
| 2014/0347574 A1 | 11/2014 | Tung et al. | |
| 2014/0362508 A1 | 12/2014 | Griffin | |
| 2015/0035792 A1 | 2/2015 | Roziere et al. | |
| 2015/0068897 A1 | 3/2015 | Neel et al. | |
| 2015/0116255 A1 | 4/2015 | Zhong et al. | |
| 2015/0212609 A1 | 7/2015 | Tung et al. | |
| 2016/0179247 A1 | 6/2016 | Blondin | |
| 2016/0291730 A1 | 10/2016 | Roziere | |
| 2018/0321771 A1 | 11/2018 | Roziere | |

FOREIGN PATENT DOCUMENTS

| | | |
|---|---|---|
| CN | 102576270 A | 7/2012 |
| CN | 202422087 U | 9/2012 |
| DE | 202012103240 U1 | 9/2012 |
| DE | 112013004411 T5 | 6/2015 |
| EP | 2207076 A2 | 7/2010 |
| EP | 2267791 A2 | 12/2010 |
| FR | 2756048 A1 | 5/1998 |
| GB | 2299394 A | 10/1996 |
| GB | 2348075 A | 9/2000 |

(56) References Cited

FOREIGN PATENT DOCUMENTS

| | | |
|---|---|---|
| JP | 2000-163031 A | 6/2000 |
| JP | 2002-342033 A | 11/2002 |
| JP | 2003-67128 A | 3/2003 |
| WO | 2001/028189 A1 | 4/2001 |
| WO | 2002/035333 A1 | 5/2002 |
| WO | 2004/114105 A2 | 12/2004 |
| WO | 2005/053287 A1 | 6/2005 |
| WO | 2005/114369 A2 | 12/2005 |
| WO | 2005/114369 A3 | 1/2006 |
| WO | 2011/015794 A1 | 2/2011 |

OTHER PUBLICATIONS

Final Office Action received for U.S. Appl. No. 16/031,723, dated Dec. 23, 2019, 7 pages.
Non-Final Office Action received for U.S. Appl. No. 14/905,778, dated Feb. 16, 2017, 12 pages.
Non-Final Office Action received for U.S. Appl. No. 15/037,313, dated Aug. 8, 2017, 7 pages.
Non-Final Office Action received for U.S. Appl. No. 16/031,723, dated Apr. 16, 2019, 8 pages.
Notice of Allowance received for U.S. Appl. No. 14/905,778, dated Jun. 19, 2017, 9 pages.
Notice of Allowance received for U.S. Appl. No. 15/037,313, dated Apr. 12, 2018, 7 pages.
Notice of Allowance received for U.S. Appl. No. 16/031,723, dated Jun. 9, 2020, 7 pages.
IBM Technical Disclosure Bulletin, "Personal Communicator Configurations", International Business Machines Corp., Thornwood, US. vol. 37, No. 6A, Jun. 1, 1994, pp. 449-453.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

* cited by examiner

COVER ACCESSORY DEVICE FOR A PORTABLE ELECTRONIC AND/OR COMPUTER APPARATUS, AND APPARATUS PROVIDED WITH SUCH AN ACCESSORY DEVICE

CROSS REFERENCE TO RELATED APPLICATIONS

This application is a continuation of U.S. patent application Ser. No. 16/031,723 (now U.S. Publication No. 2018/0321771, published on Nov. 8, 2018) filed Jul. 10, 2018, which is a continuation of U.S. patent application Ser. No. 15/037,313 (now U.S. Pat. No. 10,042,491, issued on Aug. 7, 2018), filed May 17, 2016, which is a National Phase application under 35 U.S.C. § 371 of International Application No. PCT/EP2014/074351, filed Nov. 12, 2014, which claims the priority benefit of French Patent Application No. 1361330, filed Nov. 19, 2013, the contents of which are hereby incorporated by reference in their entireties for all intended purposes.

TECHNICAL DOMAIN

The present invention relates to a covering accessory device for a portable electronic and/or computer apparatus, providing a function of detection of a command object. It also relates to a portable electronic and/or computer apparatus equipped with such an accessory device.

The domain of the invention is more specifically, but without limitation, that of contactless human-machine interfaces, implementing a capacitive detection technology, and still more specifically a capacitive detection technology implementing a guard plane for capacitive electrodes.

STATE OF THE ART

There are currently on the market many accessories aiming to cover portable electronic and/or computer apparatus, such as portable microcomputers, digital tablets or smart phones. These accessories generally have a function of protection against impacts and scratches and also aesthetic and personalization function. These accessories can come in various forms: sleeves, pockets, covers, flexible or rigid envelopes and shells.

Some of these accessories have a foldable flap intended to cover the screen and possibly the keyboard of portable apparatus. This flap protects the front surface of the portable apparatus when it is folded thereunto and opening it releases the screen and command functions.

Furthermore, more and more portable apparatus, such as tablets and smart phones are equipped with a touchscreen and provide Human-Machine Interface (HMI) functions. These apparatus use, as an interface, touchpads which are transparent on the screens and opaque in the area of a command surface arranged on the periphery of the screen. Most of these pads use capacitive technology. With this technology, one or more command objects (fingers, stylus, etc.) can be detected in contact with or at a distance from the command surface; this technology implements the capacitive technology described in the patents FR 2,893,711 or FR 2,949,007, or again in the patent application FR 2,971,666 A1, filed by the Applicant.

However, the detection functionality is currently limited to the electronic/computer apparatus. When this apparatus is provided with an accessory device comprising a movable part, such as for example a foldable protective cover, it is first necessary to handle the protective cover to leave access to the command surface and then to start to interact with the apparatus.

Additionally accessory devices, of protective cover with foldable flap type, are currently used to satisfy a single function which is apparatus protection.

An object of the present invention is to remedy the aforementioned disadvantages.

Another object of the present invention is to propose a protective accessory device for a computer/electronic apparatus providing more functionalities than currently known accessory devices.

Again another object of the present invention is to propose a protective accessory device for a computer/electronic apparatus contributing to, or even improving, the detection functionalities of such an apparatus.

Finally, it is an object of the present invention to propose a protective accessory device for a computer/electronic apparatus allowing a faster interaction and requiring less handling of said apparatus.

DESCRIPTION OF THE INVENTION

The invention proposes to achieve at least one of the aforementioned objects with a device for a portable electronic and/or computer apparatus, called user apparatus, where said device comprises a part which folds in order to cover at least one part of said user apparatus when it is folded onto said user apparatus, characterized in that said foldable part comprises at least 2 detection layers, each guarded at one guard potential and comprising at least one, preferably several, capacitive detection electrode(s):
  a first of said layers being arranged to perform a capacitive detection function of at least one command object located on one side of said foldable part, in particular the side of the inner surface of said foldable part located on the side of said user apparatus when it is folded onto said user apparatus;
  a second of said layers being arranged to perform a capacitive detection function of at least one command object located on the other side of said foldable part, in particular the side of the outer surface of said foldable part when it is folded onto said user apparatus; in order to trigger a function in said user apparatus.

In that way, one has a device, and more precisely an accessory device, with which to perform a capacitive detection function for a portable apparatus while also performing a removable protective cover function. In that way, a compact and operational equipment results whatever the effective position of the foldable part. Consequently, the device according to the invention provides more functionalities than the accessory devices from the state-of-the-art which only provide a protective function for the user apparatus.

Additionally, with the device according to the invention, it is possible to detect a command object even when the foldable part of the device is folded onto the apparatus and to trigger a function done by the user apparatus. In that way, it is possible to interact with the user apparatus without having to handle the foldable part of the device, allowing a faster interaction with less handling for the user.

The device according to the invention serves to perform a detection of a command object by a layer of guarded capacitive electrodes, which allows an improved detection of the command object.

Furthermore, the device according to the invention serves to perform a detection of a command object whatever the position of the foldable part, in that way offering the user more freedom in the positioning of the foldable part and consequently in the control of their apparatus. In fact, with the device according to the invention, the user can trigger a function in the user apparatus, whatever the position of the movable part.

Preferably, the detection layers are not coplanar, each of the detection layers forming a plane substantially parallel to the plane defined by the foldable part and/or the plane defined by at least one other detection layer.

The electrodes from at least one, preferably each, detection layer can perform an autonomous detection, in "self-detection" mode or a detection by cooperating with another electrode, in "mutual-detection" mode.

In a preferred, but in no way limiting, version one of the capacitive electrode layers is parallel to the surface of the user apparatus serving to form a display and/or comprising a touchpad provided with capacitive electrodes when the movable part is folded onto the user apparatus.

In a preferred, but in no way limiting, version the first capacitive electrode layer is also called "inner layer" and is arranged on the side of a surface, called inner, of the foldable part coming into contact with the user apparatus when the foldable part is folded onto the user apparatus, and the second layer of capacitive electrodes is also called "outer layer" and is arranged on the side of a surface called outer opposite said inner surface.

In a particular embodiment, for at least one position and/or at least one given moment, both detection layers can be activated in detection. In this case, for at least one given moment or at least one given position of the foldable part, the device according to the invention performs a detection near both surfaces of the foldable part.

According to an advantageous embodiment, each of said first and second layers can be activated in detection in turn, depending upon the relative position of the foldable part with respect to the user apparatus such that for a given position of said foldable part just one of said layers performs the detection function.

For example, when the foldable part is completely folded back onto the apparatus, only the outer layer may be activated in detection and when the foldable part is completely open only the inner layer may be activated in detection. More generally, when the foldable part has an angle β less than or equal to a preset first threshold value, only the outer layer can be activated in detection, and when the foldable part has an angle β greater than or equal to a preset second threshold value, only the inner layer can be activated in detection.

Of course, the first and second threshold values can be identical or different. The threshold value or values can be included between 45° and 135°, and in particular equal to 90°.

Alternatively, the activation in detection (respectively deactivation from detection) of at least one, preferably of each, detection layer can be done either by the user or by the user apparatus or even by a human-machine interface, or more generally an application running on the user apparatus. In this case, activation in detection (respectively deactivation from detection) is done, not as a function of the angle between the foldable part and the user apparatus, but by the user or by an application running on the user apparatus.

According to a first implementation version, the device according to the invention can further comprise at least one guard plane arranged between the first and second detection layers and placed at guard potential in order to guard at least one of said first and second detection layers during the detection of at least one command object.

In this case, the one or each guard plane is arranged between the detection layers.

The device according to the invention may comprise a dedicated guard plane for each detection layer.

According to an advantageous alternative of this first implementation version, the device according to the invention may comprise a single guard plane arranged between the first and second detection layers in order to guard each of said detection layers. Thus, with a single guard plane, the device according to the invention serves to guard two different detection layers.

According to a second particularly advantageous and preferred implementation version, the device according to the invention does not include a guard plane in addition to the detection layers. In this second version, each of the first and second detection layers performs in turn the role of:
  the function performed by—either the detection function;
    or a guard function for the other of said capacitive detection layers by being placed at an alternating potential (VG), called guard;
  each of said layers depending on the relative position of said foldable part relative to said user apparatus.

In that way, when one of the detection layers is used in detection, the other of the detection layers is used as guard plane, and vice versa. In this version, the device according to the invention serves to avoid the use of a guard plane in addition to the detection planes. In that way, the device according to the invention has a more compact architecture and is less complex and less costly to implement.

In that way, the device according to the invention automatically adapts and changes the respective functions of the electrode layers equipping the foldable part, and in particular the inner surface and outer surface of the foldable part.

For example, when the movable part is folded back: the inner layer can be set up to implement the guard function and the outer layer can be set up to implement the detection function and when the movable part is open and reaches an angle greater than a set angle relative to a surface of the apparatus: the inner layer can be set up to provide the detection function and the outer layer can be set up to provide the guard function.

In other words, and more generally, the inner layer and the outer layer can be set up such that the function done by each layer is chosen depending on the angle β between the movable part and the user apparatus, such that:
  when β is less than a first set value, the inner layer provides a guard function and the outer layer provides a detection function, and
  when β is greater than a second set value, the inner layer provides a detection function and the outer layer provides a guard function.

Of course, the first and second threshold values can be identical or different. The threshold value or values can be included between 45° and 135°, and in particular equal to 90°.

Alternatively, the activation (respectively the deactivation) in detection or in guard of at least one, preferably of each, detection layer can be done either by the user or by the user apparatus or even by a human-machine interface, or more generally an application running on the user apparatus. In this case, the functions (detection or guard) of each layer are decided not according to the angle of the folded part relative to the user apparatus, but by the user or by an application running on the user apparatus.

Advantageously, the respective electrodes of each layer can be arranged so as to substantially mask each other. It can advantageously be the same for the respective connecting tracks of each detection layer which have to substantially mask each other.

The device according to the invention can further advantageously comprise at least one means of control in order to determine, depending on the position of the foldable part, which of the electrode layers of the foldable part must implement the detection function and in order to activate the electrodes from said detection layer in measurement mode.

When the other detection layer is used as guard for guarding the layer activated in detection, the means of control can further be arranged in order to control placing the electrodes from the other electrode layer at guard potential so as to have the latter perform the guard function.

Advantageously, the control means can be coupled to, or include, a means of detection/measurement of the position of the foldable part, such as for example a means for measurement of the angle between the foldable part and the user apparatus.

The means of detection can be performed by, or include at least, one electrode, located on the inner surface of the foldable part and in particular at least one of the electrodes from the inner detection layer, targeting the user apparatus and arranged in order to measure the distance between the user apparatus and said foldable part. In that way, according to the distance measured by such an electrode, it is possible to determine the position of the foldable part.

Alternatively, if the mobile apparatus is equipped with a layer of detection electrodes, for example arranged in/on a display screen, it is also possible to use at least one electrode from the detection layer of said apparatus in order to determine the position of the foldable part. To do this, it is sufficient to activate the electrodes measuring the distance between the foldable part and the user apparatus and deactivate the targeted electrodes, at least during the measurement time, or to use different excitation frequencies on the different layers so that the electrodes from several detection layers do not disrupt each other.

Advantageously, at least one layer of electrodes is arranged in order to perform a detection of at least one command object with or without contact. In this way, the device according to the invention performs a capacitive command detection function which can be "multitouch" and/or "touchless" type.

The device according to the invention can be removable and include, at least one means of connection to the user apparatus.

This means of connection can be arranged to implement a wired or wireless connection with the user apparatus.

According to an implementation example which is in no way limiting, the means of connection can, for example, be incorporated in a portion of shell of the device according to the invention, connected to the foldable part and arranged in order to be substituted for or arranged on a rear shell of the user apparatus.

The device according to the invention can alternatively be non-removable and be an integral part of the user apparatus.

In a preferred implementation example, the foldable part of the device according to the invention may comprise a transparent area allowing visual access to a zone of the user apparatus such as a display screen or a portion of a display screen. In that way, it is possible to view a display screen from the user apparatus while interacting with the user apparatus by means of the device according to the invention, without having to open the foldable part.

When the device according to the invention is implemented for a user apparatus comprising a display screen, the foldable part, and in particular the transparent area of the foldable part, can be configured in order to be positioned on or against said screen when it is folded.

In this case at least one, preferably each, detection layer can include, at said transparent area level, electrodes made of a transparent material, for example in "Indium Tin Oxide" ITO technology, in order to conserve visual transparency around the transparent zone.

Alternatively, the transparent zone might not be provided with electrodes.

The foldable part may alternatively or additionally comprise an opaque area. In this case, at least one, preferably each, of the detection layers can include, at said opaque area level, electrodes made with PCB, Printed Circuit Board, technology.

In a specific configuration of an accessory according to the invention, the foldable part acting as a cover is arranged in order to provide in deployed capacitive detection area substantially in the extension of the screen of the user apparatus. This configuration in particular provides the user a possibility of control without Joystick type contact sought by some game consoles.

Advantageously the foldable part has a thickness greater than or equal to 0.5 mm.

According to another aspect of the invention, a portable electronic and/or computer apparatus comprising an accessory device according to the invention is proposed.

This portable apparatus according to the invention can be provided with a rear shell which is advantageously substituted by a rear shell part of an accessory device according to the invention.

The portable apparatus can comprise a display screen and the foldable part of the device according to the invention can be positioned so as to fold at least in part over said display screen.

The apparatus according to the invention may be a computer, telephone or smart phone, a game console, a PDA, a touch tablet, etc.

DESCRIPTION OF THE FIGURES AND EMBODIMENTS

Other advantages and features will appear from an examination of the detailed description of examples which are in no way limiting and of the attached drawings on which:

It is well understood that the embodiments which will be described in the following are in no way limiting. One could in particular imagine variants of the invention only comprising a selection of features subsequently described isolated from other features described, if this selection of features is sufficient to confer a technical advantage or for distinguishing the invention from the state of the prior art. This selection includes at least one preferably functional feature without structural details, or with only a portion of the structural details, if this part alone is sufficient to give a technical advantage or to distinguish the invention compared to the state of the prior art.

In particular, all the variants and all the embodiments described can be combined with each other if at the technical level nothing prevents it.

In the figures, the elements common to several figures retain the same reference.

We are now going to describe different examples of an electronic/computer device according to the invention implementing different embodiments of an accessory device according to the invention.

Figure 1:
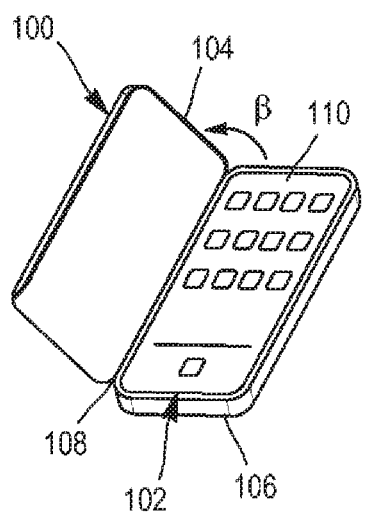
FIGS. 1-3 are schematic representations of the device according to the invention in three different configurations.
Figure 2:
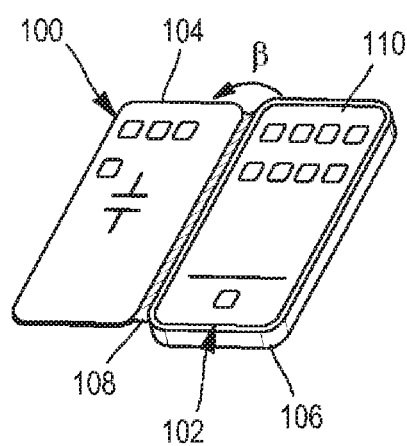
Figure 3:
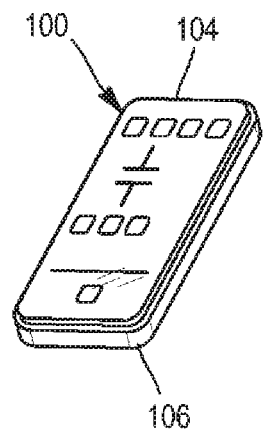

FIGS. 1 to 3 are schematic representations of a nonlimiting example of a device 100 according to the invention for user apparatus 102 such as a smart Phone® or a digital tablet.

The device 100 comes in the form of a protective cover for the user apparatus 102 and comprises a part 104 foldable relative to the user apparatus and a part 106 fixed relative to the user apparatus.

The fixed part 106 functions as a shell for the rear of the user apparatus 102 and envelops the user apparatus 102.

The foldable part 104 is mechanically connected to the fixed part 106 by a flexible connection 108 and can be rotated around this flexible connection 108 in order to be opened or be folded against the user apparatus 102. The foldable part 104 is intended to cover the screen 110 of the apparatus 102 in folded position. In FIG. 1, the foldable part 104 is open so as to form an angle β substantially equal to 135° with the plane formed by the screen 110 of the user apparatus 102. In FIG. 2, the foldable part 104 is open so as to form an angle substantially equal to 180° with the plane formed by the screen 110 of the user apparatus 102. In FIG. 3, the foldable part 104 is closed or in folded position so as to form an angle β substantially equal to 0° with the plane formed by the screen 110 of the user apparatus 102.

Figure 4:
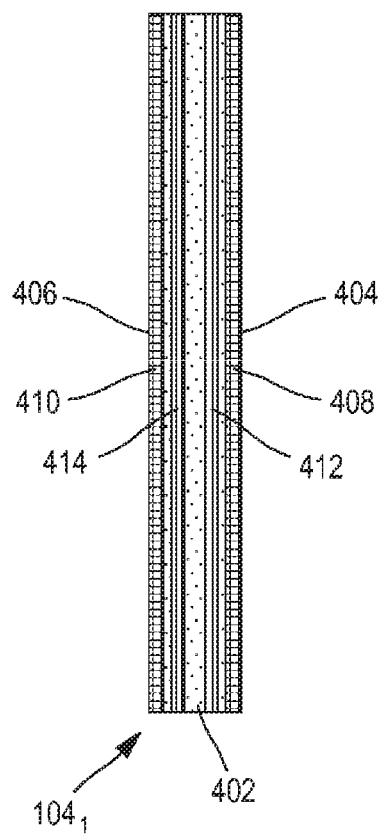
FIGS. 4-6 are schematic representations, in section view, of three implementation examples of a foldable part of a device according to the invention.
Figure 5:
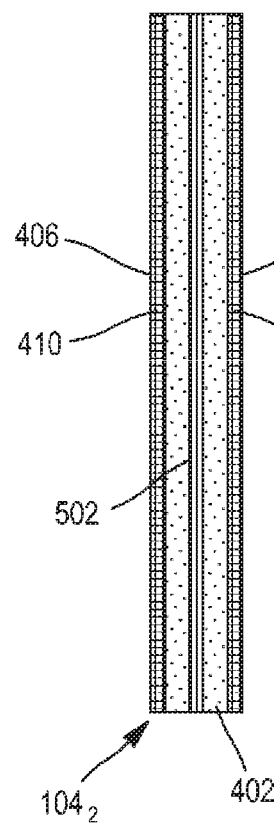
Figure 6:
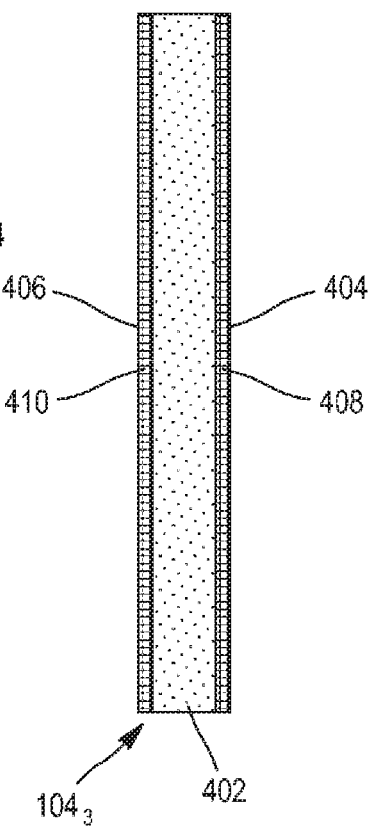

FIGS. 4-6 are schematic representations, according to a section view, of three implementation examples of a foldable part 104.

Whatever the embodiment, the foldable part 104 comprises:
- a carrying structure 402;
- an inner surface 404 provided for coming into contact with the user apparatus 102, and more specifically the screen 110 of the user apparatus, when the foldable part 104 is completely folded, such as shown in FIG. 3; and
- an outer surface 406 opposite the inner surface 404.

The inner surface 404 comprises a detection layer 408, called inner, formed by a set of capacitive detection electrodes (not shown) and the outer surface 406 comprises a detection layer 410, called outer, formed by a set of capacitive detection electrodes (not shown). Each detection layer 408 and 410 is provided and laid out in order to implement detection, with or without contact, of one or more command objects such as a finger, hand or stylus. Connecting tracks (not shown) are associated with each of the detection layers 408 and 410.

When the foldable part comprises a transparent area made of transparent material, the electrodes for each of the detection layers 408 and 410 and the connecting tracks which are found at the transparent area level are made using ITO ("Indium Tin Oxide") technology. When the foldable part 102 is completely opaque, the detection electrodes and connecting tracks are made with PCB ("Printed Circuit Board") type technologies, flexible or rigid, surrounded or not with a dielectric for protection.

In the example shown in FIG. 4, the foldable part $104_1$ further comprises a guard plane 412, called inner, associated with the inner detection layer 408 and provided for guarding the electrodes of said inner layer 408 when this layer is used for detecting one or more command objects. The foldable part $104_1$ also comprises a guard plane 414, called outer, associated with the outer detection layer 410 and provided for guarding the electrodes of said outer layer 410 when the latter is used for detecting one or more command objects. Each guard plane 412 and 414 is placed at an alternating potential VG, of a given frequency.

In the example shown in FIG. 5, the foldable part $104_2$ comprises a single guard plane 502 shared by the inner 408 and outer 410 detection layers. This single guard plane 502 is placed at an alternating guard potential VG, of a given frequency and serves to guard each of the detection layers 408 and 410.

In the example shown in FIG. 6, the foldable part $104_3$ comprises only the inner detection layers 408 and 410 and does not comprise a guard plane in addition to the detection layers 408 and 410. In this embodiment, when one of the detection layers 408 and 410 is used in detection, the other one of the detection layers 410 and 408 is used in order to form a guard by being placed at a guard potential and in that way guarding the detection layer activated in detection.

Figure 7:
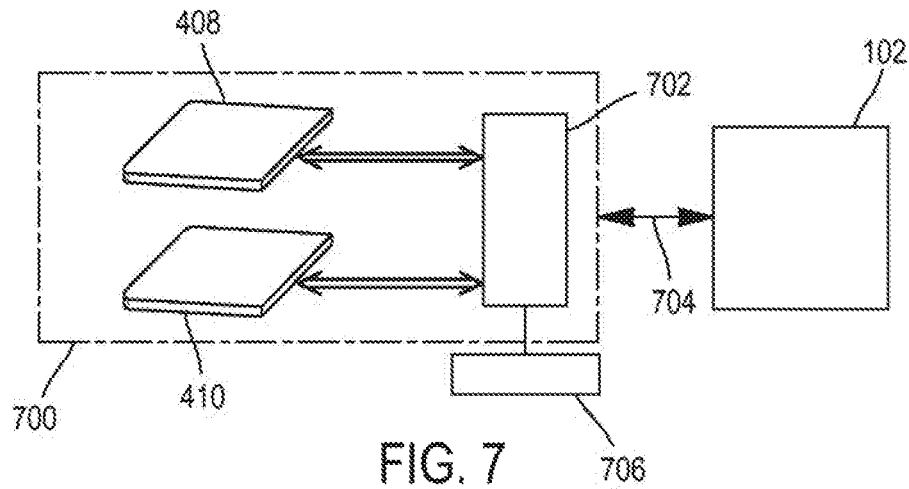
FIG. 7 is a schematic representation of a control module for a device according to the invention.

FIG. 7 is a schematic representation in diagram form of an example control and command module of a device according to the invention, controlling the components of the foldable part.

The module 700 shown in FIG. 7 comprises one control unit 702 in communication with the user apparatus 102 because of a wired or wireless means of communication 704.

The module 700 comprises or is associated with one or more sensors 706, such as one or more optical, capacitive, mechanical or magnetic sensors measuring an angle, a distance or a movement serving to determine the relative position of the foldable part 102 compared to the user apparatus 102.

The control unit is configured to receive signals from a part of the user apparatus 104 and sensors 706, process the received signals and control the detection layers 408 and 410 and possibly the guard planes 412, 414 and 502.

Additionally, the control unit 702 is also configured for receiving signals from each of the detection layers 408 and 410 and informing the user apparatus 102 of the one or more positions of the one or more command objects detected by each of the detection layers 408 and 410.

We are now going to describe the operation of the control unit 702, when the device comprises the foldable part $104_1$ shown in FIG. 4.

In a first variant, the control unit 702 can activate the inner 408 and outer 410 layers in detection at any time: in this case, the layers 408 and 410 perform a detection function for one or more command objects whatever the relative position of the foldable part 1041 compared to the user apparatus 102. In this first variant the guard planes 412 and 414 are also activated at any moment and perform the guard function.

In a second variant, the activation of the detection layers 408 and 410 is done as a function of the relative position of the foldable part $104_1$ relative to the user apparatus. In this variant, depending on the relative position of the foldable part $104_1$ relative to the user apparatus, each of the detection layers 408 and 410 is activated or not. More generally:
  when the foldable part $104_1$ has an angle β less than or equal to a first set threshold value $β_1$, the control unit 700 deactivates the inner layer 408 and only the outer layer 410 is activated in detection; and when the foldable part $104_1$ has an angle β greater than or equal to a second set threshold value $β_2$, the outer layer 410 is deactivated and only the inner layer is activated in detection.

The guard planes 412 and 414 associated respectively with the inner layer 408 and the outer layer can be activated and deactivated at the same time as the layer with which they are associated.

Of course, the first threshold value Pi can be identical, greater than or less than the second threshold value $β_2$. Each threshold value is included between 45° and 135°, and in particular is equal to 90°.

We are now going to describe the operation of the control unit 702, when the device comprises the foldable part $104_2$ shown in FIG. 5.

In order to control the foldable part $104_2$, the control unit 702 can implement the two control variants described above for the control part $104_1$, with the difference that the single guard plane 502 is activated when at least one of the detection layers 408 and 410 is activated.

We are now going to describe the operation of the control unit 702, when the device comprises the foldable part $104_3$ shown in FIG. 6.

Figure 8:
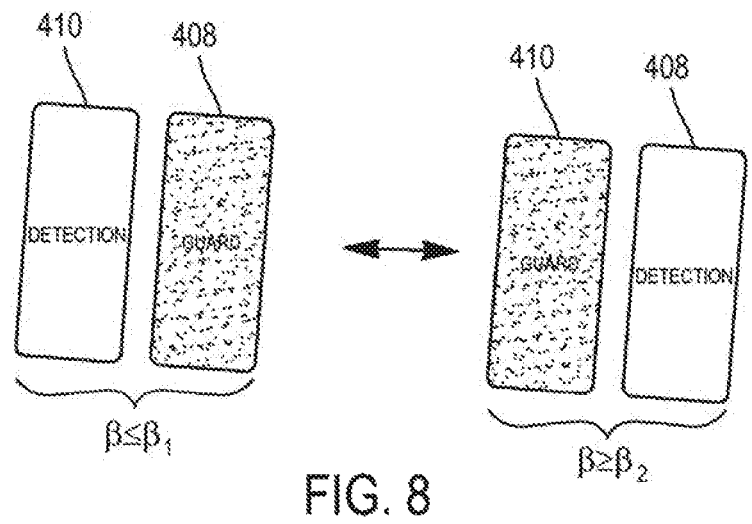
FIG. 8 is a schematic representation of the operation of the foldable part shown in FIG. 6.

The control unit 702 commands the two detection layers 408 and 410, either in "capacitive detection" function, or in "electrostatic guard" function. In that way, each of the two surfaces 404 and 406 of the foldable part $104_3$ is alternately a detection surface and a guard surface, depending on the position of the foldable part $104_3$, such as shown in FIG. 8.

In that way, when one of the detection layers is used in detection, the other detection layer is used as guard plane, and vice versa. For example, when the movable part $104_3$ is folded back: the inner layer 408 is commanded to perform the guard function by being placed at guard potential by the control unit 702 and the outer layer 410 is commanded to perform the detection function, and when the movable part $104_3$ is open and reaches an angle greater than a set angle relative to the surface of the apparatus 102: The inner layer 408 is commanded to perform the detection function and the outer layer 410 is commanded to perform the guard function by being placed by the control unit 702 at the guard potential.

In other words, and more generally, the inner layer 408 and the outer layer 410 are set up such that the function done by each layer is chosen depending on the angle β between the foldable part $104_3$ and the user apparatus 102, such that:

when β is less than a first set value $β_1$, the inner layer 408 performs a guard function and the outer layer 410 performs a detection function, and when β is greater than a second set value $β_2$, the inner layer 408 performs a detection function and the outer layer 410 performs a guard function.

Of course, the first and second threshold values can be identical or different. The threshold value or values can be included between 45° and 135°, and in particular equal to 90°.

In general, in all the embodiments described, when a detection layer is not used/activated in detection, for example because it is deactivated or activated in guard, at least one of the electrodes from this layer can be used sporadically, on request or at a set frequency, in order to detect the presence of objects opposite the surface associated with said detection layer and the type of object detected (for example a table when it involves the outer surface, a display screen when it involves the inner surface, etc.).

We are now going to describe a user apparatus according to the invention.

Figure 9:
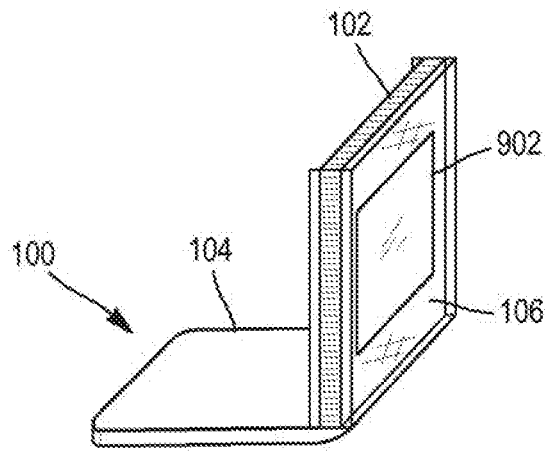
FIGS. 9-11 are schematic representations of an apparatus according to the invention, in which a portion of the device according to the invention is substituted for a rear shell of said user apparatus.
Figure 10:
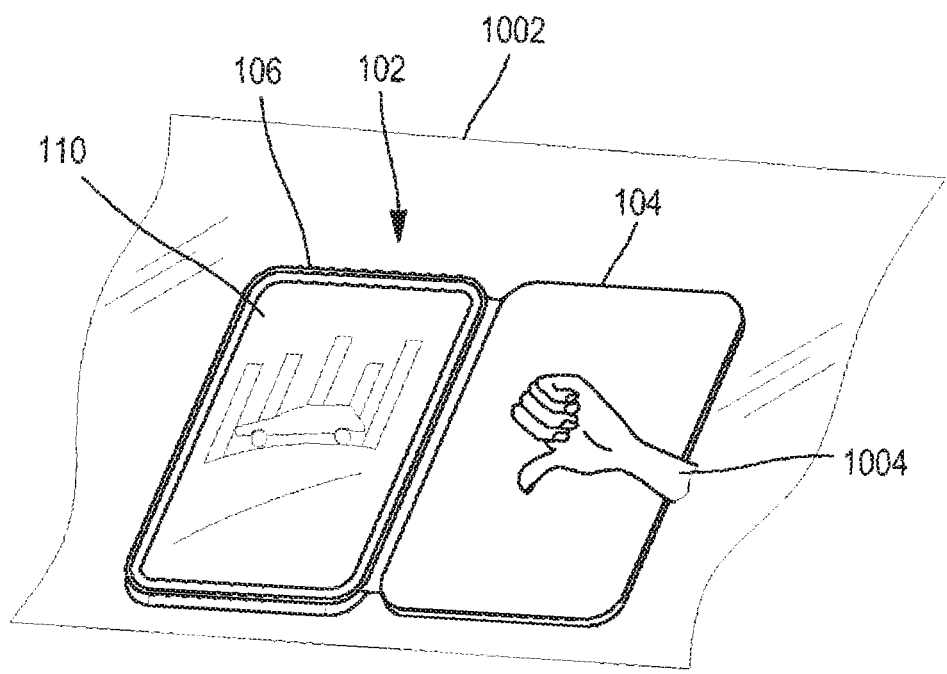
Figure 11:
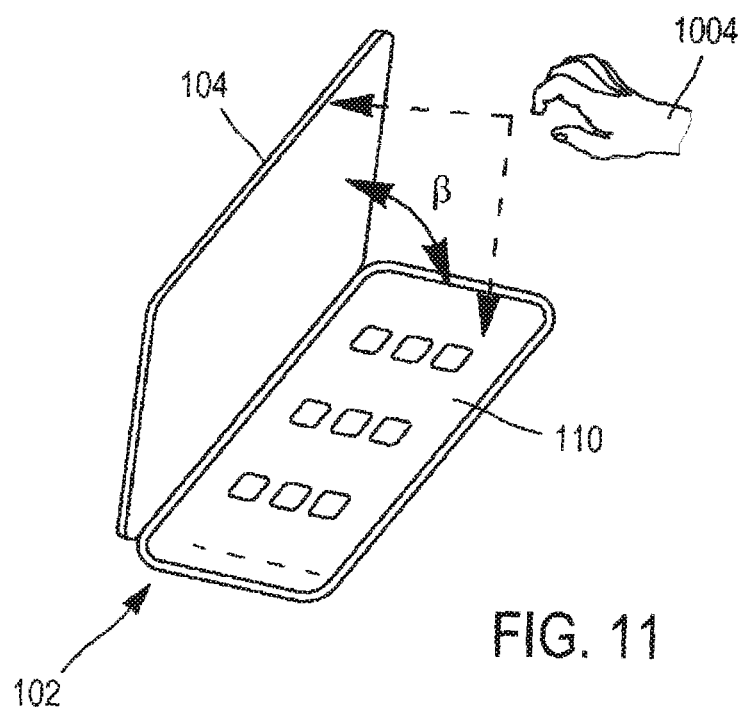

FIGS. 9-11 are schematic representations of an example implementation of a apparatus according to the invention provided with a device according to the invention comprising a fixed part coming to replace a rear shell of the portable apparatus.

The device 100 equipping the apparatus 102 comprises a fixed part 106 arranged in order to be substituted for a rear shell normally equipping the portable user portable apparatus 102.

This fixed part 106 comprises a connection device 902 intended to be enclosed in the portable apparatus 102 and to implement the necessary electrical connections for interfacing the detection layers 408 and 410 of the foldable part 104 of the accessory 100 with the control and processing modules of the portable apparatus 102. The device 100 therefore comes in the form of an accessory which is an integral part of the portable apparatus 102 to which it contributes additional functions of capacitive detection.

FIG. 10 shows a representation of the apparatus 102 from FIG. 9, set on a surface 1002, such as a table, where the foldable part 104 is open so as to obtain a touch screen keyboard assembly which allows performing "hovering" type controls for games, for example directly with the user's hand 1004 or finger. These controls can include a joystick control by inclination of the user's hand 1004 above the foldable part 104 in order to direct an object displayed on the screen 110 and can do so without hiding the screen with the hand 1004.

FIG. 11 shows a representation of the apparatus 102 from FIG. 9, set on the surface 1002, such as a table, where the foldable part 104 forms an angle β greater than or equal to 90° with the screen 110 of the apparatus 102.

The screen 110 of the user apparatus 102 is provided with a capacitive detection layer/pad in order to detect with and/or without contact one or more command objects, such as a hand with one or more fingers towards the surface involved.

The detection of the hand 1004 by both the inner layer and by the detection layer of the display screen 110 serves to implement a detection volume formed between the foldable part 104 and the display screen 110.

Of course, the invention is not limited to the examples which were just described and many improvements could be made to these examples without leaving the scope of the invention.

The invention claimed is:

1. An apparatus having a first portion capable of being oriented with respect to a second portion, the apparatus comprising:
    at least one substrate formed in the first portion;
    a plurality of layers formed with the at least one substrate in the first portion; and
    a control unit configured for detecting an orientation of the first portion with respect to the second portion and configuring at least one of the plurality of layers as a first object detecting layer and configuring at least another of the plurality of layers as a first guard layer for shielding the first object detecting layer based on the detected orientation.

2. The apparatus of claim 1, wherein a first layer of the plurality of layers is formed along a first region of the at least one substrate and a second layer of the plurality of layers is formed along a second region of the at least one substrate.

3. The apparatus of claim 2, wherein a third layer of the plurality of layers is disposed between the first and second layers, the third layer configurable to operate as the first guard layer.

4. The apparatus of claim 3, wherein a fourth layer of the plurality of layers is disposed between the third layer and the second layer, the fourth layer configurable to operate as a second guard layer.

5. The apparatus of claim 2, wherein the first layer is configurable to operate as the first object detecting layer and the second layer is configurable to operate as the first guard layer.

6. The apparatus of claim 2, wherein each of the first and second layers is configurable such that one of the first and second layers is configurable to operate as the first object detecting layer while the other of the first and second layers is configurable to operate as the first guard layer.

7. The apparatus of claim 1, wherein the first object detecting layer is configurable to perform a detection of at least one object with or without contact.

8. The apparatus of claim 1, wherein the first portion is foldable with respect to the second portion.

9. The apparatus of claim 2, wherein a function performed by each of the first and second layers depends on a position of the first portion relative to the second portion.

10. The apparatus of claim 1, wherein the at least one of the plurality of layers is configurable to operate as the first object detecting layer and the at least another of the plurality of layers is configurable to operate as the first guard layer depending on movement of the first portion with respect to the second portion.

11. The apparatus of claim 1, wherein the control unit is coupled to one or more sensors configured for detecting the orientation of the first portion with respect to the second portion.

12. A method for configuring a touch-sensitive cover of an apparatus, comprising:
  detecting an orientation of the cover with respect to the apparatus; and
  configuring at least one of a plurality of layers in the cover as a first object detecting layer and configuring at least another of the plurality of layers as a first guard layer for shielding the first object detecting layer based on the detected orientation.

13. The method of claim 12, further comprising disposing a first layer of the plurality of layers along a first region of the cover and disposing a second layer of the plurality of layers along a second region of the cover.

14. The method of claim 13, further comprising:
  disposing a third layer of the plurality of layers between the first and second layers; and
  configuring the third layer to operate as the first guard layer.

15. The method of claim 14, further comprising:
  disposing a fourth layer of the plurality of layers between the third layer and the second layer; and
  configuring the fourth layer to operate as a second guard layer.

16. The method of claim 13, further comprising:
  configuring the first layer to operate as the first object detecting layer; and
  configuring the second layer to operate as the first guard layer.

17. The method of claim 13, further comprising configuring each of the first and second layers such that one of the first and second layers is configurable to operate as the first object detecting layer while the other of the first and second layers is configurable to operate as the first guard layer.

18. The method of claim 12, further comprising configuring the first object detecting layer to perform a detection of at least one object with or without contact.

19. The method of claim 12, wherein the cover is foldable with respect to the apparatus.

20. The method of claim 13, wherein a function performed by each of the first and second layers depends on a position of the first portion relative to the second portion.

* * * * *